United States Patent [19]

Asaoka et al.

[11] Patent Number: 4,562,059
[45] Date of Patent: Dec. 31, 1985

[54] METHOD OF PREPARING ALUMINA

[75] Inventors: Sachio Asaoka, Yokohama; Takashi Sendo, Machida; Munekazu Nakamura, Yokohama, all of Japan

[73] Assignee: Chiyoda Chemical Engineering & Construction Co., Ltd., Yokohama, Japan

[21] Appl. No.: 618,698

[22] Filed: Jun. 8, 1984

[51] Int. Cl.[4] .............................. C01F 7/02; C01F 7/34
[52] U.S. Cl. .................................... 423/626; 423/628; 423/629; 423/630; 423/631
[58] Field of Search .................... 423/628, 629, 626

[56] References Cited

U.S. PATENT DOCUMENTS 4,248,852  2/1981  Wakabayashi et al. ............. 423/628

Primary Examiner—Herbert T. Carter
Attorney, Agent, or Firm—Armstrong, Nikaido, Marmelstein & Kubovcik

[57] ABSTRACT

An improved method of preparing alumina, including a first stage in which an alumina hydrogel is formed from seed aluminum hydroxide, and a second stage in which the alumina hydrogel is processed for conversion into alumina. The improvement is in the first stage, comprising the steps of: (a) providing an aqueous slurry containing seed aluminum hydroxide and (b) mixing a pH controlling agent with the aqueous slurry to adjust the pH of the aqueous slurry to a value less than 5 or more than 11 and to dissolve fine crystallites of aluminum hydroxide contained in the aqueous slurry, the pH controlling agent being substantially free of ions which can form a precipitate during the first step, and then (c) then mixing an alumina compound with the aqueous slurry to adjust the pH of the aqueous slurry to a value in the range of from 6 to 11 and to cause the seed aluminum hydroxide to grow, the steps (b) and (c) being repeated in sequence more than once so that the seed aluminum hydroxide is caused to grow into the alumina hydrogel.

11 Claims, No Drawings

METHOD OF PREPARING ALUMINA

BACKGROUND OF THE INVENTION

This invention relates to a method of preparing alumina which is useful for use as a catalyst carrier.

Alumina is now used in a wide variety of fields. γ-Alumina is suitably used as a catalyst carrier because of its large surface area, excellent mechanical strength and ability of supporting catalytic metals uniformly on its surface. γ-Alumina may be generally obtained by calcining pseudo-boehmite, which is a hydrogel of fine, fibrous boehmite crystallites, at a temperature of about 600° C. The calcination of γ-alumina at a temperature of 900°-1000° C. gives δ-alumina. At a calcination temperature of 1100° C., γ-alumina is converted into α-alumina.

Many methods have thus far been proposed for the preparation of alumina. One such method includes aging an aqueous slurry containing seed aluminum hydroxide at a pH of 6-11 for the growth of the seed crystals by coalescence. This method requires a long period of time to obtain hydrogel particles of a large size.

U.S. Pat. Nos. 4,248,852 and 4,422,960 disclose a method for the preparation of alumina suitably used as catalyst carrier, wherein first and second pH controlling agents are alternately and repeatedly mixed with an aqueous slurry containing seed aluminum hydroxide to swing the pH of the slurry between hydrogel dissolution and precipitation regions. At least one of the first and second pH controlling agents includes an aluminum compound capable of forming an alumina hydrogel. Since aluminum hydroxide is continually replenished during the hydrogel growing step, the rate at which the seed aluminum hydroxide grows in size is much higher than that in the method in which the growth of the seed particles is effected by mere coalescence of the seed particles. However, this method has been found to involve a problem in that the resulting alumina carrier does not have entirely satisfactory chemical and physical stability.

SUMMARY OF THE INVENTION

The present invention provides an improved method of preparing alumina which includes a first stage in which an alumina hydrogel is formed from seed aluminum hydroxide, and a second stage in which the resultant alumina hydrogel is processed for conversion into alumina. The improvement involves the first stage which comprises the steps of:

(a) providing an aqueous slurry containing seed aluminum hydroxide, (b) mixing a pH controlling agent with the aqueous slurry to adjust the pH of the aqueous slurry to a value less than 5 or more than 11 to dissolve fine crystallites of aluminum hydroxide contained in the aqueous slurry, the pH controlling agent being substantially free of ions which would form a precipitate during the alumina hydrogel forming stage, and (c) then mixing an aluminum compound with the aqueous slurry to adjust the pH of the aqueous slurry to a value in the range of between 6 and 11 and to cause the seed aluminum hydroxide to grow in size, the steps (b) and (c) being repeated in sequence more than once so that the seed aluminum hydroxide is caused to grow into the alumina hydrogel. The term "seed aluminum hydroxide" used herein is intended to mean a derivative of aluminum hydroxide serving as a seed for the growth of alumina hydrogel.

The above-described problem involved in the prior art method has been found to be attributed to the fact that the particle size of the primary particles from which porous alumina is formed is not uniform and there exist primary particles with various sizes. The uniformity of the primary particles and the stability of alumina are closely related to the pore characteristics of the alumina. It has been found that alumina which has a good thermal and chemical stability and whose primary particles are uniform in size must have a large total pore volume, an average pore diameter of between about 80 and 1000 Å and a large pore volume in pores of a narrow range of pore diameter (a sharp distribution of pore volume). If the particle size of the primary particles of alumina is not uniform, the total pore volume of the alumina will be reduced because pores defined between large primary particles are packed or filled with small primary particles. Further, the non-uniformity may results in the broadness of the pore volume distribution because of the formation of pores with various different pore diameters. Pores with large pore diameters are defined between large primary particles and pores with small pore diameters are defined between small primary particles. The presence of fine particles, which define pores with a diameter of 80 Å or less between them, is the major cause for the lack of chemical and thermal stability of alumina. Alumina whose primary particles are uniform in size and which has a good thermal and chemical stability can be obtained from pseudo-boehmite which has grown in size and whose primary particles are uniform in size. The improved method according to the present invention allows the formation of such pseudo-boehmite particles.

There is seen a similarlity between the above-described prior art method and the method of the present invention in that both methods include the step of changing the pH of the seed aluminum hydroxide-containing aqueous slurry between a first region in which aluminum hydroxide crystallites are dissolved and a second region in which aluminum hydroxide crystallites are precipitated to cause the growth of seed aluminum hydroxide. However, a great difference is seen to exist between the two methods in that, in the method of the present invention, the pH swing from the second region to the first region is effected by addition of a pH controlling agent which is substantially free of such ions that would form a precipitate during the alumina hydrogel forming stage and an aluminum compound is added only in the neutralizing step for the pH change from the first region to the second region. In contrast, in the prior art method, the use of an aluminum compound in the pH swinging step for changing the pH from the second region to the first region is recognized as being preferred.

The above distinctive feature of the present invention makes it easy to prepare an alumina hydrogel whose primary particles have a uniform particle size. Therefore, the alumina prepared according to the method of this invention has greater part of its pore volume in pores having a narrow range of pore diameter. Because of such a sharpness of the pore volume distribution, the alumina obtained by the method of this invention exhibits an improved chemical and thermal stability.

More specifically, when the aluminum compound is added, for neutralization, into an aluminum hydroxide-containing aqueous slurry which is replete with the pH controlling agent having substantially no such ions as to cause precipitation during the alumina hydrogel forming stage, active aluminum hydroxide crystallites having a high reactivity and a uniform particle size are formed. The active aluminum hydroxide crystallites thus formed are quickly and evenly occluded by seed aluminum hydroxide whose surface has been activated by the pH controlling agent during its maintenance in the first pH region in which pseudo-boehmite crystallites are dissolved.

On the other hand, when a neutralizing agent is added into seed aluminum hydroxide-containing slurry which is replete with an aluminum compound (e.g. aluminum chloride) used as a pH controlling agent and when the neutralizing agent contains an aluminum component (e.g. sodium aluminate), then the active aluminum hydroxide, which is formed from the two kinds of aluminum compounds, becomes non-uniform in size. In the above case, when an acid or alkali which is free of ions capable of forming a precipitate (e.g. sodium hydroxide) is used as the neutralizing agent in place of the aluminum component-containing compound, there are caused local variations in pH, microscopically, in the slurry because of infeasibility of any buffur action. Such a local decrease or increase in pH of the reaction mixture results in the formation of active aluminum hydroxide having a non-uniform particle size. As described above, the lack of uniformity of the particle size of the primary particles prevents the uniform growth of seed aluminum hydroxide.

It is also important that the swing of the pH of a seed aluminum hydroxide-containing slurry from the second, alumina hydrogel precipitation region to the first, alumina hydrogel dissolution region should be effected by addition of a pH controlling agent which would not form any precipitation, in order to selectively dissolve fine aluminum hydroxide crystallites and to allow the seed aluminum hydroxide to grow in size uniformly. If the pH swing is effected by addition of an aluminum compound such as an aluminum salt or an aluminate, the dissolution of fine aluminum hydroxide crystallites does not quickly and sufficiently proceed because of the buffur action of aluminum ion or the aluminate ion derived from the aluminum compound, thereby the seed aluminum hydroxide becomes non-uniform in size. In the method of the present invention, the buffur action is utilized effectively only in the neutralizing step for the formation of active aluminum hydroxide particles having a uniform size and, thus, no buffur action is involved in the pH swinging step to expedite the selective dissolution of the fine aluminum hydroxide crystallites.

It is, therefore, an object of the present invention to provide a method by which alumina having improved pore characteristics and being useful as a catalyst carrier or an absorbent can be prepared.

It is a more specific object of the present invention to provide a method of preparing alumina whose pore volume is distributed in pores of a narrow range of pore diameters.

It is yet a further object of the present invention to provide an improved method of preparing alumina particles each of which is constituted from primary particles having uniform particle sizes.

Other objects, features and advantages of the present invention will become apparent from the detailed description of the present invention which follows.

DETAILED DESCRIPTION OF THE INVENTION

An aqueous slurry containing seed aluminum hydroxide may be prepared by any conventional methods. For example, such a slurry may be produced by (1) adding an alkali, such as aqueous ammonia or an aqueous solution of sodium hydroxide, to an aqueous solution of an aluminum salt of a strong acid such as aluminum nitrate, aluminum chloride or aluminum sulfate at a pH of 6–11, and (2) adding an acid, such as nitric acid, sulfuric acid or hydrochloric acid, or an aqueous solution of the above aluminum salt to an aqueous solution of sodium aluminate, potassium aluminate or the like aluminate at a pH of 6–11.

As described hereinafter, the pH controlling agent and the aluminum compound which are to be added to the slurry for the formation of alumina hydrogel can be the same substances as used in the slurry forming step. Therefore, the slurry forming step and the subsequent alumina hydrogel forming step may be conducted consecutively. However, it is not necessary to use the same reagents, for the formation of seed aluminum hydroxide-containing slurry, as used in the subsequent hydrogel forming step. For example, it is possible to use a combination of aluminum sulfate and sodium aluminate for the purpose of preparing seed aluminum hydroxide-containing slurry. Such a combination is rather advantageous in that the seed aluminum hydroxide may be prepared within a short period of time. Though such a combination will give seed aluminum hydroxide with non-uniform size, the lack of the uniformity may be corrected during the subsequent hydrogel forming step according to the method of the present invention. In any event, the formation of the seed aluminum hydroxide and the growth thereof to the alumina hydrogel can be continuously performed in accordance with the method of the present invention without a need of separation, washing and other operations after the formation of the seed aluminum hydroxide.

The seed aluminum hydroxide prepared by the above-described neutralization reaction is found to have a fibrous form having a length of 100 Å and a diameter of 10–20 Å by microscopic techniques. The fibrous material is considered to have a boehmite structure. However, because of its smallness in particle size, an X-ray diffraction analysis indicates that the fibrous material is amorphous.

To the thus obtained aqueous slurry containing seed aluminum hydroxide are then alternately added a pH controlling agent and an aluminum compound. By the addition of the pH controlling agent, the pH of the aqueous solution is swung to a first pH region which is less than 5 or more than 11 so that fine crystallites of aluminum hydroxide contained in the slurry are dissolved. By the addition of the aluminum compound, the slurry whose pH has been swung to the first region is neutralized and adjusted to a value in the range of between 6 and 11 (second region) so that the seed aluminum hydroxide is caused to grow in size by occlusion thereinto of active aluminum hydroxide crystallites derived from the aluminum compound.

The pH swing and neutralization steps are generally performed at a temperature of at least 50° C., preferably at least 70° C., with agitation. At a temperature of below 50° C., the primary particles, from which each alumina particle is constituted, tend to become irregular in size. Under a pressurized condition, the hydrogel forming stage may be carried out at a temperature of over 100° C. However, no specific advantage will be obtained by the use of such a high temperature. Rather it is disadvantageous to perform the alumina hydrogel forming stage at a temperature of over 100° C. because the operation become complicated and the particle size of primary particles tends to lack uniformity. Thus, the reaction temperature in the alumina hydrogel forming stage has an influence upon the uniformity of the primary particles of the resultant alumina. From the standpoint of sharpness of pore distribution, however, such an influence is not great when the temperature is 50° C. or more and can be ignored when the temperature is 70° C. or more. The uniformity of the primary particles of $\gamma$-alumina can be evaluated from the sharpness of pore distribution of $\gamma$-alumina measured by a mercury penetration method. As a supplementary means, X-ray diffraction techniques may be adopted for the evaluation of the uniformity, the evaluation being made by the height of the base line reflecting the amorphous portion and the height of peaks of the crystalline portion in the X-ray diffraction patterns of $\gamma$-alumina. The uniformity may be directly evaluated from electron microscopy. The results from X-ray diffraction and microscopic techniques are in well conformity with those from the mercury penetration method.

Any acid or alkali may be used as the pH controlling agent so far as it can swing the pH of the aqueous slurry to the first pH region but would not generate ions capable of forming a precipitate during the alumina hydrogel forming stage. Aluminum salts or aluminates should not be used as the pH controlling agent. The use of substances generating phosphate ion should also be prohibited. Illustrative of suitable pH controlling agents are nitric acid, sulfuric acid, hydrochloric acid, sodium hydroxide or potassium hydroxide. Examples of the aluminum compound used for the neutralization step include sodium aluminate, potassium aluminate, aluminum sulfate, aluminum chloride. The amount of the pH controlling agent added in each pH swinging step and the amount of the aluminum compound added in each neutralizing step should be so controlled as to adjust the pH of the aqueous slurry to the above-specified pH range. If the pH is swung excessively by addition of a large amount of the pH controlling agent, then not only fine crystallites of aluminum hydroxide but also the seed aluminum hydroxide which has been growing in size will dissolve. Moreover, the addition of a large amount of the pH controlling agent requires a large amount of the aluminum compound for neutralization in the subsequent step, which causes the formation of a large amount of active aluminum hydroxide. In this case, since the seed aluminum hydroxide cannot occlude too much active aluminum hydroxide at one time, the excess active aluminum hydroxide will coalesce with each other to form new seed aluminum hydroxide, resulting in the lack of uniformity in size of the alumina hydrogel. For this reason, it is preferred that the pH controlling agent be added in each pH swinging step in an amount so that the pH is swung to the range of between 2 and 5 or betweeen 11 and 13.

The number of operations of the pH swing followed by neutralization varies according to the amounts of the pH controlling agent and the aluminum compound added in each operation. It is necessary to repeat the combined operation of the pH swing and neutralization until such pseudo-boehmite is formed that may give alumina the majority of the primary particles of which can exhibit good thermal and chemical stability, i.e. until alumina having the majority of its pore volume in pores having a pore diameter of 80 Å or more is formed. Generally, the number of the repetitions is thrice or more times. The upper limit of the number of repetition cannot be specifically determined. Several tens repetions may give alumina having satisfactory physical properties within a practically acceptable period of time.

In each pH adjustment, the slurry is maintained at each pH region for a period of time sufficient for attain the selective dissolution of fine aluminum hydroxide crystallites in the case of the first region and for ensurement of the occlusion of active aluminum hydroxide into the seed aluminum hydroxide in the case of the second region. Such a period is generally at least one minute preferably at least 5 min, though the time period is closely related to the pH value, especially of the first region. To investigate the contribution of the holding time of the slurry in respective pH regions, the changes of the viscosity and turbidity of the slurry and of the X-ray diffraction patterns and pore distribution of the resulting alumina were measured. As a result, it was confirmed that after 1 min holding time, there was observed no significant change. After 5 min holding time in each pH region, substantially no charge was observed. When the holding time in each pH region exceeded 30 min, the pore volume was disadvantageously decreased, though the pore distribution was remained unchanged. Thus, for example, about 30 times repetions of the combined pH swing and neutralization operation may be conducted within about 5 hours.

The aluminum compound and the pH controlling agent are added to the slurry, preferably in the form of an aqueous solution. The concentrations of the aluminum compound and the pH controlling agent in respective solutions are not critical. However, it is advisable to adjust the concentrations of the aluminum compound and the pH controlling agent so that the reaction mixture can be always agitated uniformly and completely throughout the hydrogel forming stage while preventing the occurrence of local increase or decrease in pH of the reaction mixture.

The resultant slurry containing boehmite hydrogel particles which have thus grown in size is then processed to obtain alumina in the manner known per se, for example, in the following manner: The hydrogel is filtered to obtain a cake. After being washed with water for the removal of sulfate ion, sodium ion, etc., the cake is dehydrated to control its solids content, thereby to facilitate the subsequent molding operation. The cake of which the water content has thus been adjusted is molded into any desired shape by way of, for example, extrusion, oil dropping and wet granulation method. A spray dry method may also be adopted for the formation of powdery alumina carrier. The extrudates or other shaped boehmite thus obtained are then dried, generally at a temperatures of 100°–200° C., and calcined to obtain alumina. If $\gamma$-alumina is intended, the calcination is generally performed at a temperature of 400°–700° C.

The alumina product obtained according to the method of the present invention has an improved thermal and chemical stability and may be advantageously used in a variety of fields, for example, as a catalyst carrier. Such an improved stability is considered to be attributed to the sharpness in its pore volume distribution and the uniformity of its primary particles. For the purpose of the present specification, the term "primary particle" is intended to mean an ultimate or unit particle which has superimposed crystal phase detectable by X-ray diffraction patterns of the alumina, whose size and shape can be known by electron microscope and from which each porous alumina particle is constituted. Thus, each porous alumina particle is a secondary or aggregated particle formed of a multiplicity of the primary particles bound together, the space defined between the primary particles accounting for the porosity of the alumina particle.

The following examples will further illustrate the present invention. In the examples, the term "pore volume distribution evaluating factor" is a factor for the evaluation of the sharpness in pore volume distribution of a given alumina sample and is defined by the following equation:

$$p = \frac{H}{PV(cc/g) \times D_M(\text{Å})}$$

wherein p stands for the pore volume distribution evaluating factor of the alumina, PV stands for the pore volume of the alumina, $D_M$ stands for such a median value that the volume of pores of the alumina having pore diameters of $D_M$ or more is equal to that having pore diameters of $D_M$ or less, and H stands for the relative half value width of the alumina expressed by the formula $H=(D_2-D_1)/D_M$ (where $D_M$ has the same meaning as above, $D_2$ is such a median value that the volume of pores having pore diameters of $D_2$ or more is equal to that having pore diameters of between $D_M$ and $D_2$, and $D_1$ is such a median value that the volume of pores having pore diameters of $D_1$ or less is equal to that having pore diameters of between $D_1$ and $D_M$).

The stability of alumina may be evaluated from its median value $D_M$ which is proportional to the diameter of its primary particles. The relative half value width H is useful for evaluating the relative sharpness of the pore distribution of alumina samples having a similar pore volume and a similar pore diameter. The sharper is the pore volume distribution, the smaller becomes the half value width. The sharpness of the pore volume distribution of alumina samples may be evaluated from the pore volume distribution evaluating factor, even when the alumina samples have different pore volumes and different pore diameters. The sharper is the pore volume distribution, the smaller becomes the factor. The method according to the present invention can produce alumina having a pore volume distribution evaluating factor of 0.002 or less, generally between 0.0005 and 0.002. The use of nitric acid as the pH controlling agent allows the production of alumina with a pore volume evaluation factor of 0.001 or less, generally between 0.0005 and 0.001.

EXAMPLE 1

0.15 liter of sulfuric acid (containing 11.6 weight % of $H_2SO_4$) and 10 liters of a deionized water were placed in an enamel-coated vessel and heated to 90° C., to which was added 0.39 liter of an aqueous solution of sodium aluminate (concentration 69 g/liter in terms of $Al_2O_3$) all at once, with vigorous agitation, to form a seed aluminum hydroxide-containing slurry having a pH of 10. After being agitated at 90° C. for 10 min, the slurry was added with 0.15 liter of the above sulfuric acid so that the pH of the slurry was decreased to 3.5. After being maintained at 90° C. for 5 min with agitation, the slurry was then added with 0.3 liter of the above sodium aluminate solution so that the pH of the slurry was increased to 10. The resultant slurry was maintained at 90° C. for 10 min with agitation. Such a pH swing and subsequent neutralization operation as described above was repeated 9 times in total. The slurries obtained in 5-9 times pH swing and neutralization treatment were sampled and filtered. The solids phase thus separated by filtration was dispersed into 10 liters of deionized water and the dispersion was then filtered. Such a dispersion and filtration operation was repeated twice more to obtain a cake. Each of the thus obtained five kinds of cake, which was found to contain no sulfuric acid residue, was extruded through a die to obtain an extrudate having a diameter of 1.6 mm. Each extrudate was dried at 120° C. for 6 hours and then calcined at 500° C. for 3 hours whereby to obtain Alumina Samples A, B, C, D and E, whose physical properties are shown in Table 1.

COMPARATIVE EXAMPLE 0.05 liter of an aqueous solution of aluminum sulfate (concentration: 80 g/liter in terms of $Al_2O_3$) and 10 liters of deionized water were placed in an enamel-coated vessel and heated to 90° C. Then 0.35 liter of an aqueous solution of sodium aluminate (concentration: 69 g/liter in terms of $Al_2O_3$) was poured into the vessel all at once, with vigorous agitation, to form a slurry having a pH of 10. After being agitated at 90° C. for 10 min, the slurry was added with 0.05 liter of the above aqueous aluminum sulfate solution so that the pH of the slurry became 3.5. The slurry, after being maintained at 90° C. for 5 min with agitation, was then added with 0.32 liter of the above sodium aluminate solution so that the pH of the slurry was increased to 10. The resulting slurry was agitated at 90° C. for 10 min. Such a pH swing and subsequent neutralization operation as described above was repeated 4 times more, i.e. total 5 times. The slurries which were subjected to 3-5 times (total) of the pH swing and neutralizing treatment were sampled and filtered. The solids phase was dispersed into 10 liters of deionized water and the dispersion was filtered. Such a dispersion and filtration operation was repeated twice more to obtain a cake. Each of the thus obtained 3 kinds of the cakes was extruded, dried and calcined in the same manner as described in Example 1 to obtain Alumina Samples $R_1$ to $R_3$ whose physical properties are shown in Table 1.

TABLE 1

| | A | B | C | D | E | $R_1$ | $R_2$ | $R_3$ |
|---|---|---|---|---|---|---|---|---|
| Pore volume (cc/g) | 0.60 | 0.71 | 0.85 | 0.97 | 1.12 | 0.90 | 0.97 | 1.12 |
| Median value $D_M$ (Å) | 102 | 123 | 155 | 206 | 286 | 155 | 220 | 365 |
| Relative half value width H | 0.10 | 0.15 | 0.26 | 0.33 | 0.55 | 0.37 | 0.55 | 0.89 |
| Pore volume | 0.0016 | 0.0017 | 0.002 | 0.0017 | 0.0016 | 0.0027 | 0.0026 | 0.0022 |

TABLE 1-continued

| | A | B | C | D | E | R₁ | R₂ | R₃ |
|---|---|---|---|---|---|---|---|---|
| distribution evaluation factor P | | | | | | | | |

EXAMPLE 2

0.15 liter of sulfuric acid (obtained by dissolving 1652 g of concentrated nitric acid in 5 liters of water) and 10 liters of a deionized water were placed in an enamel-coated vessel and heated to 95° C., to which was added 0.4 liter of an aqueous solution of sodium aluminate (concentration 69 g/liter in terms of $Al_2O_3$) all at once, with vigorous agitation, to form a seed aluminum hydroxide-containing slurry having a pH of 10. After being agitated at 90° C. for 15 min, the slurry was added with 0.165 liter of the above nitric acid so that the pH of the slurry was decreased to 2.5. After being maintained at 95° C. for 5 min with agitation, the slurry was then added with 0.4 liter of the above sodium aluminate solution so that the pH of the slurry was increased to 11. The resultant slurry was maintained at 90° C. for 15 min with agitation. Such a pH swing and subsequent neutralization operation as described above was repeated 17 times in total. The resultant slurry was filtered, washed, dried and calcined in the same manner as in Example 1 to obtain Alumina Sample F whose physical properties are shown in Table 2.

EXAMPLE 3

0.13 liter of 2.28N hydrochloric acid and 10 liters of a deionized water were placed in an enamel-coated vessel and heated to 90° C., to which was added 0.28 liter of an aqueous solution of sodium aluminate (concentration 69 g/liter in terms of $Al_2O_3$) all at once, with vigorous agitation, to form a seed aluminum hydroxide-containing slurry. After being agitated at 90° C. for 15 min, the slurry was added with 0.13 liter of the above hydrochloric acid so that the pH of the slurry was decreased to 3.5. After being maintained at 90° C. for 5 min with agitation, the slurry was then added with 0.35 liter of the above sodium aluminate solution so that the pH of the slurry was increased to 9. The resultant slurry was maintained at 90° C. for 15 min with agitation. Such a pH swing and subsequent neutralization operation as described above was repeated 13 times in total. The slurry was filtered to obtain a cake and the cake was washed, dried and calcined in the same manner as in Example 1 to obtain an Alumina Sample G whose physical properties are shown in Table 2.

EXAMPLE 4

0.25 liter of an aqueous solution of aluminum sulfate (concentration: 80 g/liter in terms of $Al_2O_3$) and 10 liters of deionized water were placed in an enamel-coated vessel and heated to 90° C. Then 0.34 liter of 5N aqueous sodium hydroxide solution was poured into the vessel all at once, with vigorous agitation, to form a seed aluminum hydroxide-containing slurry having a pH of 10.5. After being agitated at 90° C. for 5 min, the slurry was added with 0.31 liter of the above aqueous sodium hydroxide solution so that the pH of the slurry became 12.5. The slurry, after being maintained at 90° C. for 5 min with agitation, was then added with 0.25 liter of the above aluminum sulfate solution so that the pH of the slurry was increased to 10. The resulting slurry was agitated at 90° C. for 10 min. Such a pH swing and subseqent neutralization operation as described above was repeated 5 times more, i.e., total 6 times. The resultant slurry was processed in the same manner as that in Example 1 to obtain Alumina Sample H whose physical properties are shown in Table 2.

TABLE 2

| | F | G | H |
|---|---|---|---|
| Pore volume (cc/g) | 0.92 | 0.87 | 0.90 |
| Median value $D_M$ (Å) | 210 | 159 | 160 |
| Relative half value width H | 0.17 | 0.23 | 0.27 |
| Pore volume distribution evaluation factor P | 0.00088 | 0.0017 | 0.0019 |

From the results shown in Table 2, it is seen that the Alumina Samples F, G and H obtained according to the present invention are each formed from primary particles of uniform size and have sharp pore volume distributions. Especially, the use of nitric acid as the pH controlling agent gives alumina of a very small pore volume distribution evaluating factor (Sample G).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the change which come within the meaning and range of equivalency of the claims are therefore intended to be embraced therein.

We claim:

1. In a method of preparing alumina, including forming an alumina hydrogel from seed aluminum hydroxide, and processing the alumina hydrogel for conversion into alumina, the improvement comprising the alumina hydrogel forming stage which comprises the steps of:
   (a) providing an aqueous slurry containing seed aluminum hydroxide,
   (b) mixing a pH controlling agent with the aqueous slurry to adjust the pH of the aqueous slurry to a value less than 5 or more than 11 and to dissolve fine crystallites of aluminum hydroxide contained in the aqueous slurry, said pH controlling agent being substantially free of aluminum salts, aluminates or ions which can form a precipitate during the alumina hydrogel forming stage, and
   (c) then mixing an aluminum compound with the aqueous slurry to adjust the pH of the aqueous slurry to value in the range of from 6 to 11 and to cause the seed aluminum hydroxide to grow, the steps (b) and (c) being repeated in sequence more than once so that the seed aluminum hydroxide is caused to grow into the alumina hydrogel.

2. A method as claimed in claim 1, wherein the alumina hydrogel forming step is performed at a temperature of at least 50° C.

3. A method as claimed in claim 1, wherein the steps (b) and (c) is conducted while agitating the slurry.

4. A method as claimed in claim 1, wherein the pH-controlling agent is sulfuric acid, nitric acid or hydrochloric acid.

5. A method as claimed in claim 4, wherein the aluminum compound is an aluminate.

6. A method as claimed in claim 5, wherein the pH-controlling agent is nitric acid and the aluminum compound is sodium aluminate or potassium aluminate.

7. A method as claimed in claim 1, wherein the pH-controlling agent is sodium hydroxide or potassium hydroxide.

8. A method as claimed in claim 7, wherein the aluminum compound is an aluminum salt.

9. A method as claimed in claim 8, wherein the aluminum salt is aluminum sulfate, aluminum nitrate or aluminum chloride.

10. A method as claimed in claim 1, wherein the step (a) includes mixing an aqueous solution containing aluminum sulfate with an aqueous solution of containing sodium aluminate.

11. A method as claimed in claim 1, wherein the pH-controlling agent is nitric acid and the aluminum compound is sodium aluminate.

* * * * *